US008560630B2

(12) United States Patent
Malkhi et al.

(10) Patent No.: US 8,560,630 B2
(45) Date of Patent: Oct. 15, 2013

(54) SHARING DATA OVER TRUSTED NETWORKS

(75) Inventors: Dahlia Malkhi, Palo Alto, CA (US); Lidong Zhou, Sunnyvale, CA (US); Yaacov Fernandess, Jerusalem (IL)

(73) Assignee: Microsoft Corporation, Redmond, WA (US)

(*) Notice: Subject to any disclaimer, the term of this patent is extended or adjusted under 35 U.S.C. 154(b) by 673 days.

(21) Appl. No.: 11/680,412

(22) Filed: Feb. 28, 2007

(65) Prior Publication Data
US 2008/0209523 A1     Aug. 28, 2008

(51) Int. Cl.
*G06F 15/173* (2006.01)

(52) U.S. Cl.
USPC ........................................ 709/217

(58) Field of Classification Search
USPC ................ 709/204–207, 218; 715/733–759
See application file for complete search history.

(56) References Cited

U.S. PATENT DOCUMENTS

| | | | |
|---|---|---|---|
| 6,295,541 B1* | 9/2001 | Bodnar et al. ..................... 1/1 | |
| 6,993,555 B2 | 1/2006 | Kay et al. | |
| 2003/0236830 A1* | 12/2003 | Ortiz et al. ................ 709/204 | |
| 2005/0004995 A1 | 1/2005 | Stochosky | |
| 2005/0050222 A1 | 3/2005 | Packer | |
| 2005/0171955 A1 | 8/2005 | Hull et al. | |
| 2005/0235034 A1 | 10/2005 | Chen et al. | |
| 2005/0267975 A1 | 12/2005 | Qureshi et al. | |
| 2006/0080432 A1 | 4/2006 | Spataro et al. | |
| 2006/0173753 A1 | 8/2006 | Padmanabhan et al. | |
| 2006/0235873 A1 | 10/2006 | Thomas | |
| 2007/0064626 A1* | 3/2007 | Evans ........................... 370/254 |
| 2007/0174389 A1* | 7/2007 | Armstrong et al. .......... 709/204 |

FOREIGN PATENT DOCUMENTS

WO        01/03036 A1    1/2001

OTHER PUBLICATIONS

Ribak, et al., "Ask Before You Search"—Peer Support and Community Building with ReachOut, ACM, CSCW '02, Nov. 16-20, 2002 New Orleans, Louisiana, http://www.research.ibm.com/haifa/dept/imt/papers/ReachOutCSCW2002.pdf.
Microsoft Corporation, "Nocturnal Overview", http://research.microsoft.com/research/sv/nocturnal/, Printed Feb. 28, 2006.
Macedo, et al. "Automatically Sharing Web Experiences through a Hyperdocument Recommender System", ACM, HT'03, Aug. 26-30, 2003, Nottingham, United Kingdom, pp. 48-56, http://delivery.acm.org/10.1145/910000/900061/p48-macedo.pdf?key1=900061&key2=1866917611&coll=GUIDE&dl=GUIDE&CFID=9978601&CFTOKEN=65320602.
Persson, "GeoNotes: A Location-based Information System for Public Spaces", 2002, Designing Information Spaces: The Social Navigation Approac, Springer, pp. 151-173, http://www.sics.se/~petra/SocNavCh6.pdf.

* cited by examiner

*Primary Examiner* — Scott Christensen
(74) *Attorney, Agent, or Firm* — Vierra Magen Marcus LLP

(57) ABSTRACT

Data is automatically shared over one or more contact networks which are interrelated by a trust relationship. The data can be shared using a network-based communication service and is stored as a data record in a local data store. The communication service may be implemented as an instant messaging, electronic mail, mobile phone or some other type of communication service. The data record can include data created by a user, a relevance value, a maximum share count and/or other data. The number of times that data may be shared may be configured by the user that generates the data. The relevance of the data may be updated each time the data is shared.

19 Claims, 11 Drawing Sheets

| Object Name | Relevance Value | Path | Annotation | Max Count | Current Count | time stamp |
|---|---|---|---|---|---|---|
| www.site.com | 0.8 | U1/U2/U3 | movie | 3 | 2 | 01:23:14 |

SHARING DATA OVER TRUSTED NETWORKS

BACKGROUND

The Internet is a useful medium for communicating information. For example, in a web-based instant messaging service, a user logs into the messaging service and sends instant messages to another user logged into the service. In an electronic mail service, a user may send an email with information and/or an attached file to another user through a web-based email service. The information sent from one user to another may be shared with other users as well. For example, an email sent by one user may be forwarded to other email users and instant message text may be manually repeated by the first recipient of the message. Another example of sharing data over a network may be the sharing of video data between users having no trust relationship, such as through a web service provided by YouTube, Incorporated, of San Bruno, Calif.

One disadvantage of typical communication services is that they utilize infrastructures based on centralized servers, which raises concerns for trust and privacy. Additionally, users of typical communication services have minimal control over sharing information with other users outside their network. For example, once a user sends an email to a second user, there is no control over how that email is shared. The email may be shared as many times as subsequent recipient's desire. Furthermore, there is typically no indication of how important the information is to subsequent recipients.

It would be advantageous to provide improved sharing capabilities of information for users of a communication service.

SUMMARY

The technology described herein pertains to automatically sharing data between one or more sets of contacts interrelated by a trust relationship over one or more networks. The network may be any communication medium, including the Internet, an ad-hoc wireless communication or some other network. In some embodiments, the network may be a point-to-point network that interconnects individuals interrelated by a predefined trust relationship. The data can be shared using a network-based communication service. Shared data is stored as a data record in a local data store automatically or in response to user input. The data record can include data created by a user, application specific data such as a relevance value, general data such as a time stamp and maximum share count, and/or other data. Relevance data indicates the importance of the data from the local user's perspective and may change each time the data is shared. The share count may indicate the number of times the data may be shared.

In one embodiment, data may be shared over a communication service. In some embodiments, the data may be shared via communication channels connecting individuals that use the same network service. The communication service may allow for file sharing between a user and one or more of the user's contacts which also have an account with the service. In some embodiments, the communication service may be implemented as an instant messaging, electronic mail, mobile phone or some other type of communication service. The communication service may have a file sharing feature that allows two users currently logged into the communication service to maintain synchronized folders of data at their respective computer. When data, such as a file or a data record, is placed into the shared folder of a first user, the shared folder for the second user will be updated with the data in the first user's shared folder.

Data may be shared between two or more sets of contacts or users networks connected with a trust relationship. In one embodiment, a trust relationship is a relationship between a user and a user's contact. Shared data may be any of several types of data and may be part of a data record. The data record may have a number of fields which include different data, such as a maximum number of times to share the data record, the number of times the data has been shared so far, the path along which the data has been shared, a data relevance value, annotations, a time stamp and other data. In some embodiments, the data in the data record may include application specific data (data relevance value), general meta-data (data path shared), and other types of data. In some embodiments, shared data can be used to manipulate other data.

An embodiment may allow data to be shared over a communication service. A first user may create data to be shared with other users. The data can then be automatically shared through the communication service with two or more sets of contacts. The two or more sets of contacts can be interrelated by one or more trust relationships. In some embodiments, at least one of the two or more sets of contacts is not associated with the first user.

Another embodiment may allow data to be shared between communication partners, such as a first user and a second user. Data to be shared may be associated with a first relevance value by a first user. The data and corresponding relevance value may then be automatically transmitted to a second user. The first user and second user communicate using a communication service and have a first trust relationship. After transmitting the data, a second relevance value is automatically determined based on the first relevance value for the data received by the second user and the trust relationship between the first user and the second user.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1A:
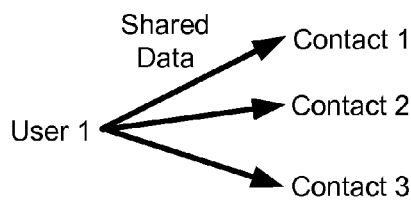
FIGS. 1A-1C illustrate a relationship tree over which data may be shared.

Data is automatically shared over one or more contact networks interrelated by a trust relationship. The data can be shared using a network-based communication service. The communication service may share data over a point to point network which interconnects service users by a trust relationship. The shared data is stored automatically or in response to user input as a data record in a local data store. The data record can include data created by a user, application specific data such as relevance value, general data such as time stamp and a maximum share count, and/or other data. Relevance data indicates the importance of the data and may change each time the data is shared. For example, as a data record is shared away from its creator, the data relevance value may decrease. The share count may indicate the number of times the data may be shared.

In one embodiment, data shared over a communication service allows file sharing between a user and one or more of the user's contacts which have an account with the service. In some embodiments, the data is shared using communication channels of the network service. The channels may be between a user and a contact, rather than between a user and the general public or some other group of people who do not have a trust relationship with the user. For example, the communication service may be implemented over communication channels of an instant messaging, electronic mail, mobile phone or some other type of communication service. In some embodiments, the communication service may be implemented as "Windows Live Messenger," by Microsoft Corporation of Redmond, Wash. In other embodiments, other messaging applications or other communication services may be used to implement the present technology.

In some embodiments, the communication service may have a file sharing feature. For example, a messaging service may have a file sharing feature that allows two users who are currently logged into the communication service to maintain synchronized folders or "shared folders" of data files or data at their respective computer. Both users may have a synchronized shared folder on their local machine. When data, such as a file or a data record, is placed into the shared folder of a first user, the shared folder for the second user will be updated with the data in the first user's shared folder. Using a communication channel between the two users of the communication service, a copy of the file or data record is sent to the second user and placed in the second user's shared folder.

Data may be shared between one or more sets of contacts or users connected through a trust relationship. In one embodiment, a trust relationship is a relationship between a user and a user's contact. A user may have one or more contacts associated with the user's account with a communication service. For example, a trust relationship may exist between a first user and a second user once the first user adds the second user as a contact with respect to the first user's account with the communication service, such that the first user may send data to the second user. The trust relationship may exist as part of an existing connection between the users that are family members, co-workers, friends or have some other relationship. A first user has a trust relationship with the other user because the first user has selected each contact to associate with their account with the communication service.

In some embodiments, a user may assign a weight value to each contact. The weight value may indicate a level of trust that a user associates with the particular contact. As such, the weight value may be used to determine the relevance of data received from a contact. Weighting a trust relationship is discussed in more detail below.

The shared data between contacts may be application specific, non-application specific metadata, and/or other data. Shared data may include information selected or created by a user, such as a person's name, a movie name, a unified resource locator (URL) and/or other data. In some embodiments, the shared data may be part of a data record. The data record may have a number of fields for different types of data, such as a maximum number of times to share data, the number of times the data has been shared so far, the path along which the data has been shared, a data relevance value, annotations, a time stamp and other data.

As the data record is shared, portions of the record may change. For example, the path of the data, the relevance of the data, annotations added to the data record and optionally other data may change each time that the data record is shared. Other portions of the data may remain the same as the data is shared, such as a URL or other information selected by a user. Thus, the portions of the data contained in the data record do not change, the data record as a whole is typically changed in some way when it is shared from one user to another.

In some embodiments, shared data can be used to manipulate other data. If a user performs a search for a list of URLs, the results from the search may be manipulated by data shared with the particular user by trusted contacts of the user. For example, if a search for URLs provided a list of ranked URL entries, and one URL entry matches data stored in the user's shared data folder, the rank of the matching entry may be increased to reflect the relevance of the entry to the user.

The data sharing and data manipulation feature may be implemented by one or more applications. For example, a peer-to-peer client-based communication application may implement the data sharing feature and a network browser application may implement the data manipulation feature. Additionally, in some embodiments, another application may be used to generate data that is shared. In this case, a first application or set of code may generate the data in response to user input, a second application or set of code may share the data automatically with two or more sets of trusted contacts, and a third application or set of code may manipulate the shared data for each contact which receives the data. For purposes of example, the present technology will be discussed with respect to a single application which generates, shares and manipulates data. This is for purposes for example only, and is not intended to limit the scope of the present technology.

Figure 1B:
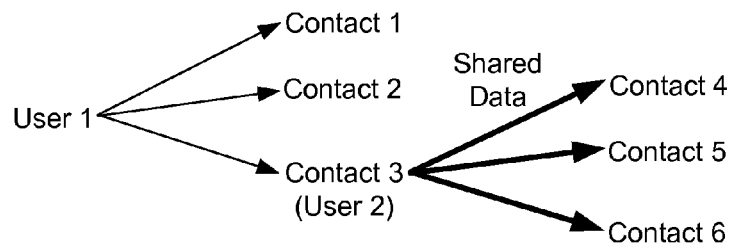
Figure 1C:
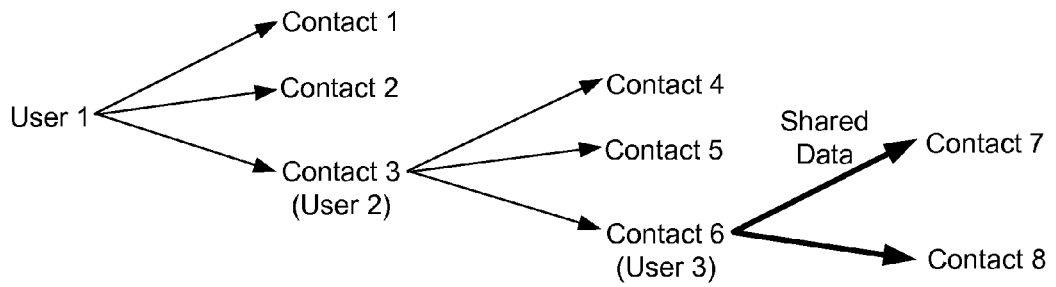

FIGS. 1A-1C illustrate a relationship tree through which data may be shared. FIG. 1A illustrates a user 1 having contacts 1, 2 and 3. User 1 may share data with each of contacts 1-3 as illustrated by the three arrows from user 1 to each of the three contacts. Though not illustrated, contacts 1-3 may also share data with user 1. Contacts 1-3 are associated with the user's account with a communication service and form a trusted network for user 1.

FIG. 1B illustrates user 1 and contacts 1-3 of FIG. 1A as well as contacts 4, 5 and 6. As FIG. 1B illustrates, contact 3 is now considered user 2 and may share data with contacts 4, 5 and 6. User 2 has a trusted network of user 1 and contacts 4-6. As indicated by the arrows from user 2 to contacts 4-6, user 2 (contact 3) may share the data received from user 1 with each of contacts 4-6.

FIG. 1C illustrates user 1 and contacts 1-6 as well as contacts 7 and 8. User 3 (contact 6 in FIG. 1B) has a trusted network of user 2 and contacts 7-8. As illustrated by the arrows in FIG. 1C, user 3 may share the data received from user 2 (contact 3) with contacts 7-8.

As illustrated in FIGS. 1A-1C, a user may share data with one or more sets of user contacts. A first user may share data with his or her contacts. One or more of those contacts which receive the shared data from the first user may then share the data with their contacts. Those contacts may further share the data with their contacts. In this manner, data may be shared through trusted relationships (a relationship between a user and the user's contact) over several sets of contacts. For example, in FIGS. 1A-1C, user 1 has as first set of contacts consisting of contacts 1-3. Contact 3 (user 2) has a second set of contacts consisting of contacts 4-6. Contact 6 (user 3) has a third set of contacts consisting of contacts 7-8. The first and second sets of contacts are interconnected by the trust relationship between user 1 and user 2 (contact 3) and the second and third sets of contacts are interconnected by the trust relationship between user 2 and user 3 (contact 6).

Figure 2A:
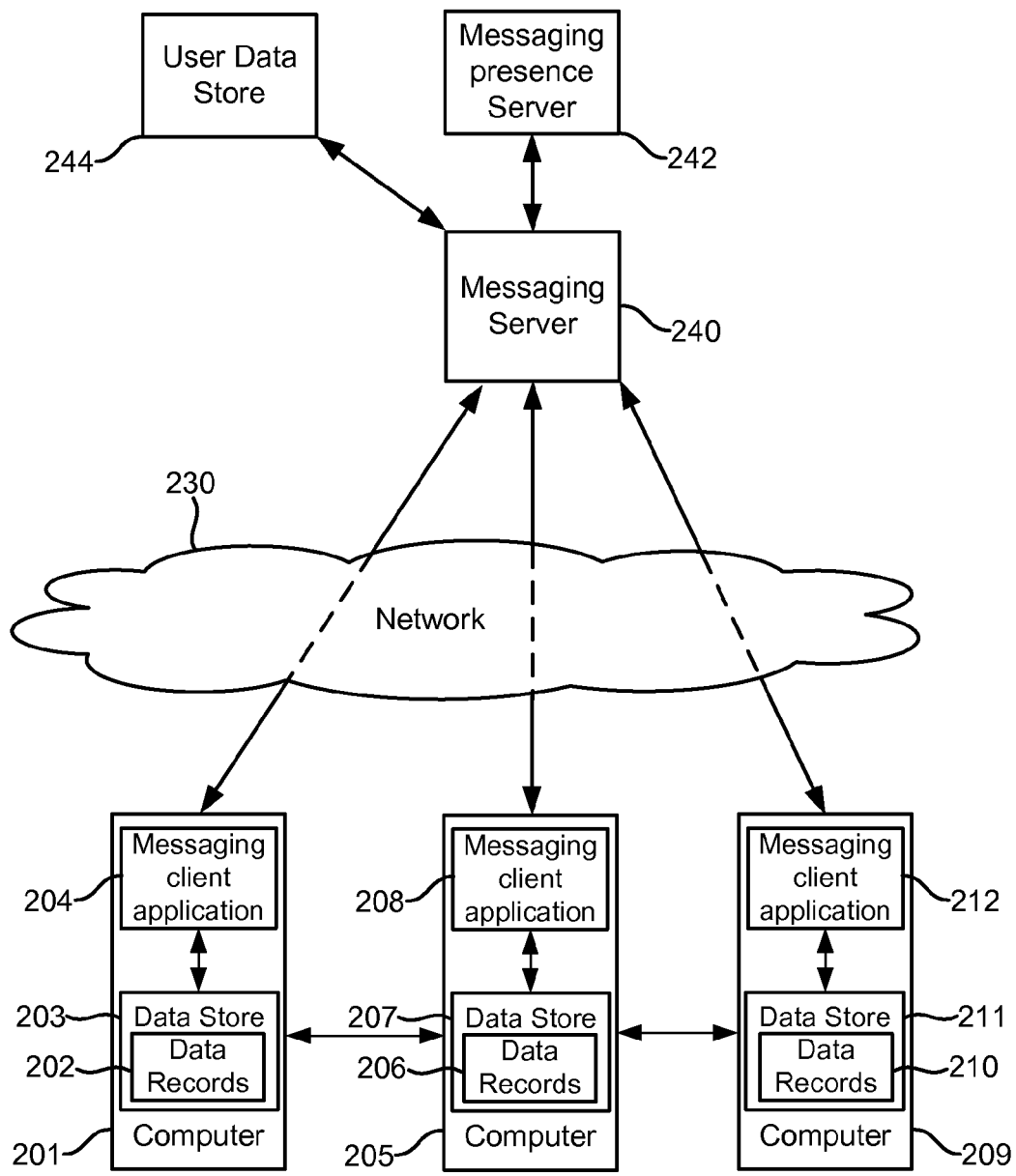
FIG. 2A illustrates a block diagram of an embodiment of a system for sharing data between messaging client applications.

FIG. 2A illustrates a block diagram of an embodiment of a system for sharing data between messaging client applications. FIG. 2A includes computers 201, 205 and 209, network 230, messaging server 240, messaging presence server 242 and user data store 244. Computers 201, 205 and 209 may communicate with messaging server 240 over network 230. In some embodiments, network 230 may be implemented as the Internet or other WAN, a LAN, intranet, extranet, private network or other network or networks. For example, network 230 may be a point-to-point network that interconnects individuals interrelated by a predefined rust relationship.

Computer 201 includes messaging client application 204 and data store 203, which includes data records 202. Computer 201 may be implemented as any computing device, such as that described in more detail below with respect to FIG. 3. Messaging client application 204 is an application which resides on client computer 201 and communicates with messaging server 240. Messaging client application 204 may be implemented as "Windows Messenger" by Microsoft Corporation or as some other messaging application. Data store 203 may store data, such as data records 202, in a storage device of computer 201. Data records 202 may be accessed by messaging client application 204 and shared with computers 205 and 209, as well as other computing devices. An example of a data record is discussed in more detail with respect to FIG. 6.

Computers 205 and 209 are implemented similarly to computer 201. Computer 205 includes messaging client application 208 and data store 207, which includes data records 206. Computer 209 includes messaging client application 212 and data store 211, which includes data records 210. As indicated by the arrows between them, computers 201, 205 and 209 may communicate and automatically share data records with each other.

Messaging server 240 may be implemented as one or more servers which manage messaging functions between users having an account with a messaging service. Messaging server 240 may handle client login, broker connections between messaging applications, route notification data and perform other tasks. Messaging server 240 communicates with messaging presence server 242, one or more messaging client applications such as application 204 on a computer 201, and other modules.

Messaging presence server 242 may be implemented as one or more servers that store and manage presence information provided by messaging server 240. Presence information indicates whether or not a user having an account with a messaging service is currently logged into the messaging service. The presence information stored on messaging presence server 242 may be queried and accessed by other machines.

User data store 244 may store and manage user data associated with a messaging service. The user data may include user contact data, login information, contact lists, data sharing preferences, and other user data. User data may be retrieved from user data store 244 by querying the data store, for example by messaging server 240. User data store 244 can be implemented as one or more data stores, databases, or other machines that store user data associated with a messaging service.

Figure 2B:
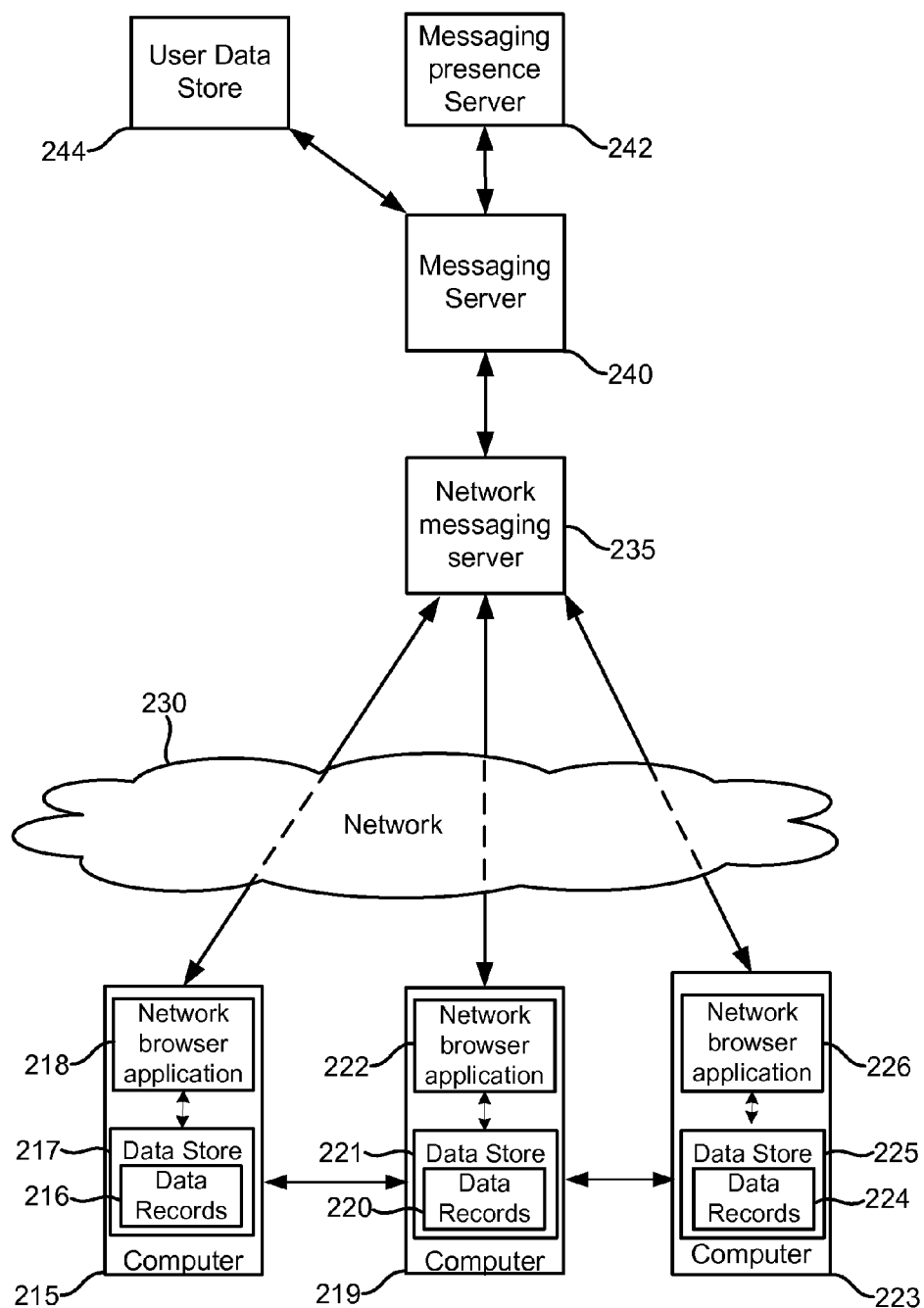
FIG. 2B illustrates a block diagram of an embodiment of a system for sharing data between web-based messaging applications.

FIG. 2B illustrates a block diagram of an embodiment of a system for sharing data between web-based applications. FIG. 2B includes computers 215, 219 and 223, network 230, network messaging server 235, messaging server 240, messaging presence server 242 and user data store 244.

Computer 215 includes network browser application 218 and data store 217, which includes data records 216. Network browser application 218 may be used to retrieve and provide content from network messaging server 235. The content pages may implement a communication service interface, such as an instant messaging interface, email interface, or some other interface. In one embodiment, network browser application 218 may be implemented as an internet browser application, such as "Internet Explorer" by Microsoft Corporation. Network browser application 218 may communicate with data store 217 to access data records 216.

Computers 219 and 223 are implemented similarly to computer 215. Computer 219 includes network browser application 222 and data store 221, which includes data records 220. Computer 223 includes network browser application 226 and data store 225, which includes data records 224. Each of computers 215, 219 and 223 may share data with each other as indicated by the representative arrows between them.

Network messaging server 235 may act as an intermediary between messaging server 240 and a network browser application on computers 215, 219 and 223. In particular, network messaging server 235 may provide network page content to network browser applications 218, 222 and 226. The network page content may include an interface which allows a user to log into and use a messaging service, email service or some other messaging service. In some embodiments, when network 230 is implemented as the Internet, network messaging server 172 may be implemented as a web server.

Figure 2C:
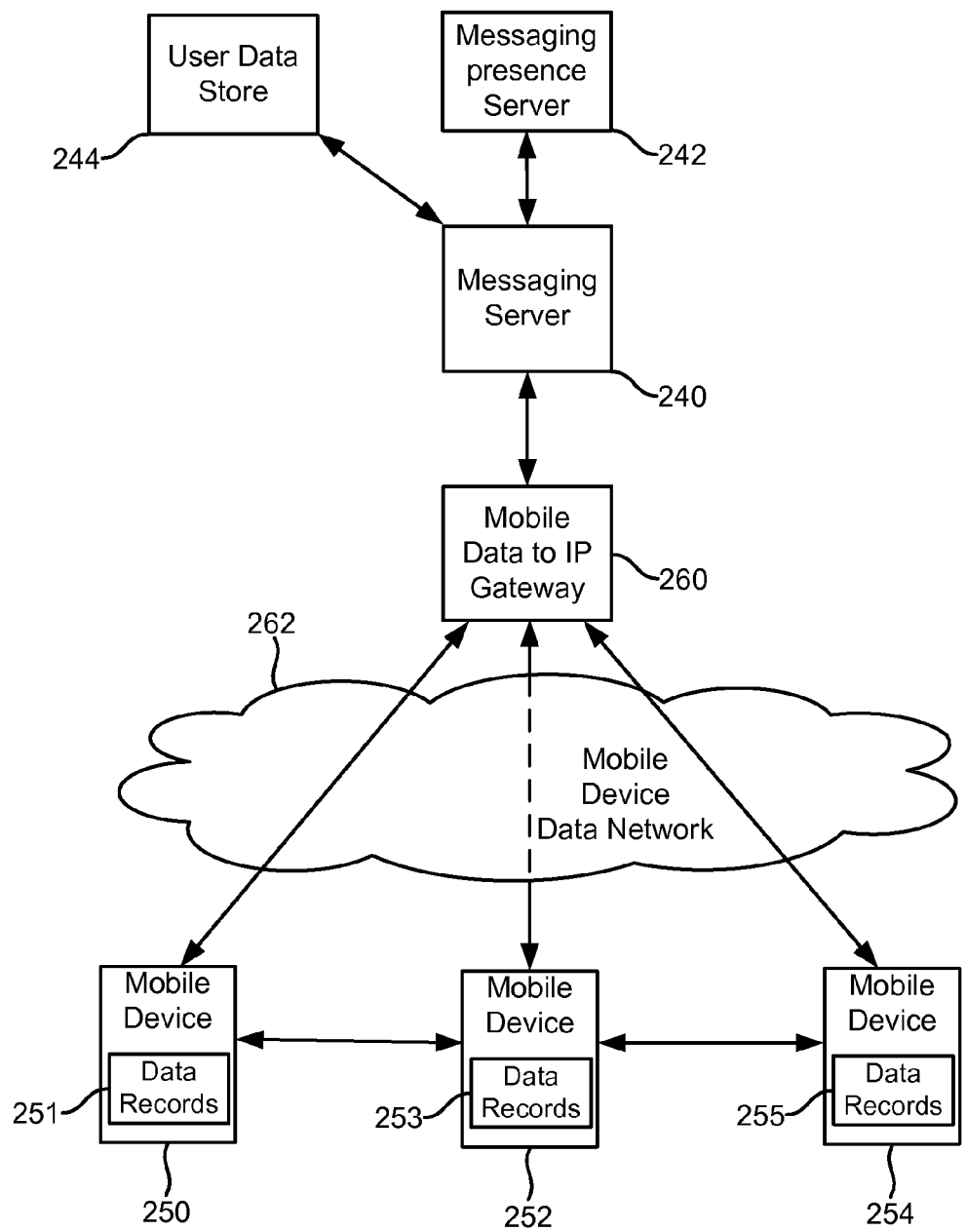
FIG. 2C illustrates a block diagram of an embodiment of a system for sharing data between mobile devices.

FIG. 2C illustrates a block diagram of an embodiment of a system for sharing data between mobile devices. The block diagram of FIG. 2C includes mobile devices 250, 252 and 253, mobile device data network 262, mobile data to IP gateway 260, messaging server 240, messaging presence server 242 and user data store 244.

Mobile device 250 includes data records 251. Data records 251 may be shared with another mobile device, such as mobile device 252 or mobile device 253. Mobile device 250 may be implemented as a mobile phone, a personal digital assistant (PDA) or some other mobile device.

Mobile devices 252 and 253 are implemented similarly to mobile device 250. Mobile device 252 includes data records 253 which can be shared with mobile devices 250 and 253. Mobile device 253 includes data records 254 which can be shared with mobile devices 250 and 252. Mobile devices 252-253 access mobile data to IP gateway 260 through mobile device data network 262.

Mobile data to IP gateway 260 is a system which receives signals and/or data from mobile devices 250-253 and provides the data to mobile data to IP gateway 260. Similarly, communications from gateway 260 may be transmitted and received from any of mobile devices 250-253.

Communications between mobile data to IP gateway 260 and each of mobile devices 250-253 are sent over mobile device data network 262. Network 262 may include cell stations, relay stations and other equipment for sending and receiving data between a mobile device and gateway 260. In some embodiments, mobile devices 250, 252 and 254 can communicate directly through an ad hoc network, without utilizing modules 244, 242, 240, and 260. In this embodiment, the mobile device intercommunication represents a peer-to-peer system of communicating devices.

Figure 3:
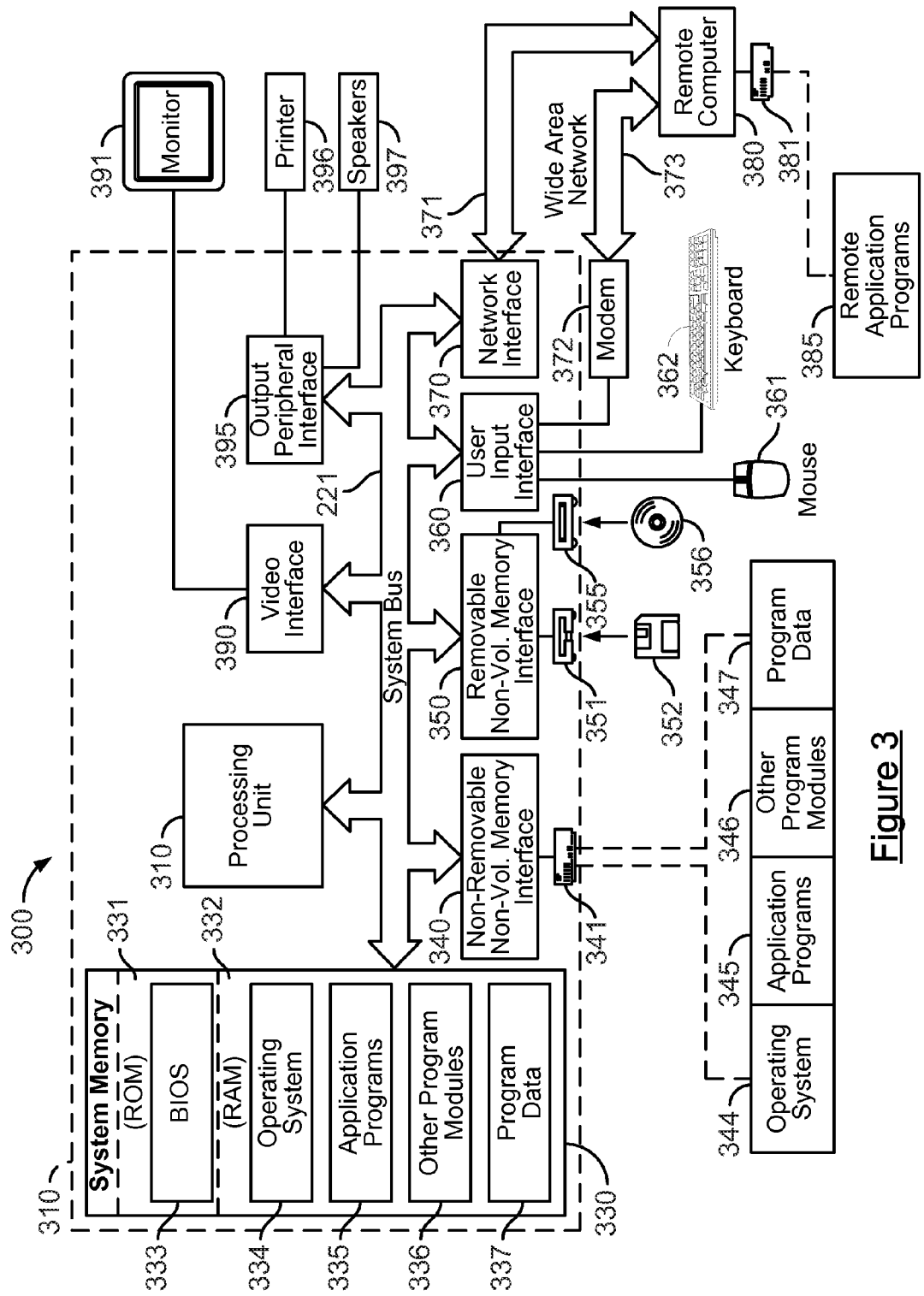
FIG. 3 illustrates an embodiment of a computing environment to implement the present technology.

FIG. 3 illustrates an embodiment of a computing environment to implement the present technology. In one embodiment, the computing environment of FIG. 3A provides more detail for computers 201, 205 and 209, messaging server 240, messaging presence server 242, user data store 244, computers 215, 319 and 223, network messaging server 235, mobile devices 250, 252 and 253 and mobile data to IP gateway 260.

Computing environment 300 of FIG. 3 is only one example of a suitable computing environment and is not intended to suggest any limitation as to the scope of use or functionality of the technology herein. Neither should the computing environment 300 be interpreted as having any dependency or requirement relating to any one or combination of components illustrated in the exemplary operating environment 300.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the technology herein includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during startup, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 30 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

FIGS. 4 through 10 are discussed with respect to the messaging system of FIG. 2A. However, the present technology as discussed with respect to FIGS. 4-10 could be used with systems other than a messaging system, such as a web-based messaging system, an electronic mail system, a mobile device system using one or more mobile devices such as cell phones, or some other system.

Figure 4:
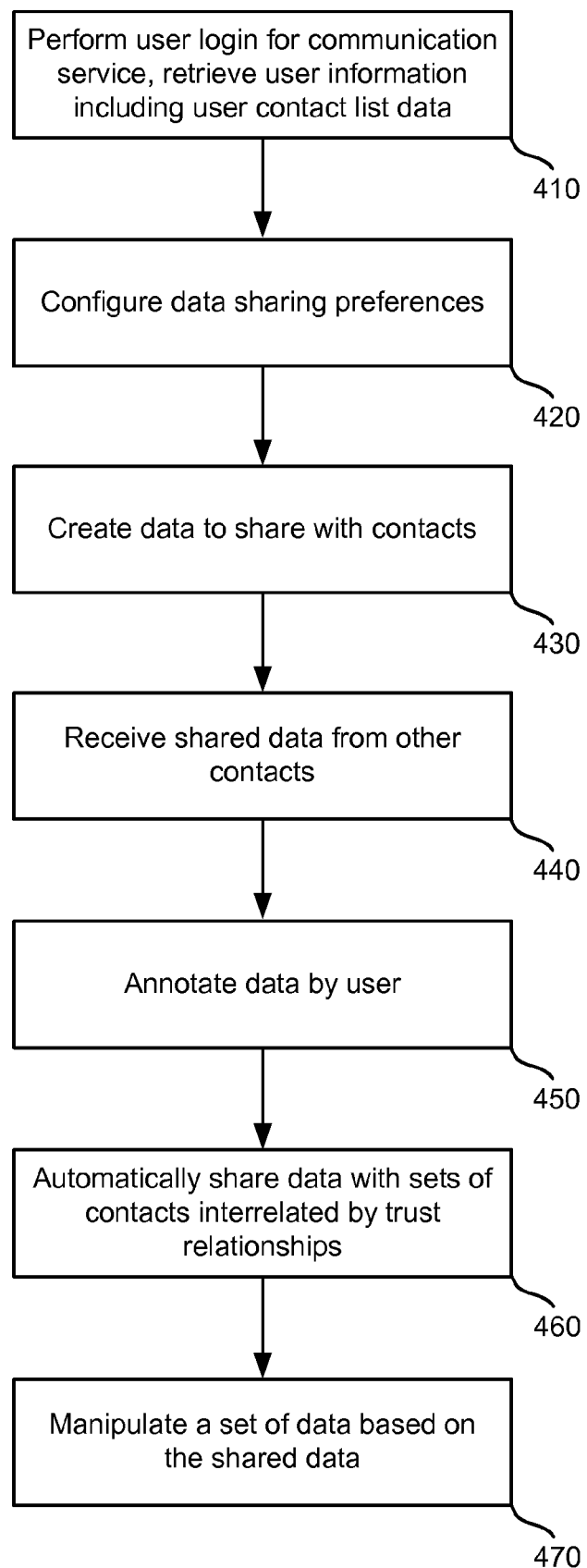
FIG. 4 illustrates a flowchart of an embodiment of a process for sharing data between networks interrelated by trust relationships.

FIG. 4 illustrates a flowchart of an embodiment of a process for sharing data between networks interrelated by trust relationships. A user attempts to log into a communication service, such as a messaging service, at step 410. When user login is successful, a user may communicate with contacts which are also logged in to the communication service.

An exemplary user login may begin with receiving login information from a user by messaging client application 204 of computer 201. Messaging client application 204 may forward the login information to messaging server 240 in a login request. The login information may include a username, password and optionally other data. Messaging server 240 receives the login information and queries user data store 244 to determine if the received login information matches login information for a messaging service account. If the login information received by messaging server 240 matches data for a messaging account at user data store 244, user data store 244 provides messaging server 240 with a confirmation and other user data associated with the account. The user data may include user contacts, user messaging preferences and other data. Messaging server 240 may send a query to messaging presence server 242 for presence information for the contacts of the logged in user. Messaging presence server 242 generates and sends a response to messaging server 240 indicating which of the user contacts are currently logged into the messaging service. The list of contacts, contact presence information and messaging preference information is forwarded to messaging client application 204 by messaging server 240.

Steps 420-470 may be performed by the present technology in any order. For purposes of example, the steps are discussed in the order they are listed in the flow chart of FIG. 4. Data sharing preferences are configured at step 420. The data sharing preferences may be configured through one or more interfaces provided by messaging client application 204. The data sharing preferences can include a number of times data can be shared, default relevancy value of shared data, a weight to assign to each user contact, and other preferences. Configuring data sharing preferences for a user is described in more detail below with respect to FIG. 5.

A user may create data to share with one or more contacts at step 430. The data may be created in response to user input received through messaging client application 204 or some other application. For example, messaging client application 204 or another application may receive input selecting a URL. The received input may be stored as a data record in a local data store. The created data may be generated in response to user input by a browser application, client application, or some other application. The data creating application may or may not be the same application as that used to share data as discussed with respect to step 460. After creating the data, the data is stored locally to the users computing device. Creating data to share with one or more user contacts is discussed in more detail below with respect to FIG. 7.

Shared data may be received from other contacts at step 440. The shared data may be received from a contact associated with the user or some other trusted source. For example, in FIG. 1C, user 3 (contact 6) may receive shared data from user 2 (contact 3). Once shared data is received from a contact, messaging client application 204 may process the data. Processing the data may include changing the relevance value, path and other data fields of the received data. Receiving shared data from other contacts is discussed in more detail below with respect to FIG. 8.

Data which is shared and/or to be shared may be annotated by a user at step 450. A user may annotate data created by the user or received from a contact. Annotating data may include adding keywords to the data, associating the data with a category or performing some other annotation. An annotation to data may be saved as part of a data record. An exemplary data record is discussed with respect to FIG. 6. For example, a user may annotate data consisting of a URL of a movie home page with the name of the movie or simply with the word "movie."

Next, data is automatically shared over one or more sets of contacts interrelated by trust relationships at step 460. The data created at step 430 and received at step 440 may be automatically shared with user contacts. The data is received by those contacts, updated and manipulated, and automatically shared with the contacts of the user's contacts. This is discussed in more detail below with respect to FIG. 9. After sharing data, a set of data may be manipulated based on the shared data at step 470. Manipulating a set of data may include changing the relevance of one or more entries of a search result based on the shared data. Manipulating data based on shared data is discussed in more detail below with respect to FIG. 10.

The process of FIG. 4 describes creating, processing and sharing of data from the point of view of a computing device associated with a single user. The steps may be performed by one or more applications residing on the user's computing device. It is understood that the data flow implemented by the present technology can occur over several computing devices, such as from computer 201 to 205 to 209, from computer 215 to 219 to 223, and/or from mobile device 250 to 252 to 254, as discussed with respect to FIGS. 1A-2C. In particular, data to be shared is created by a user at a computing device as described at step 430. The data is then shared with the user's contacts at step 460. The contacts receive the data from the sharing user. Receiving data is described with respect to step 440. The contacts receive the data, the data is manipulated, annotated and optionally otherwise processed. The processed data is then shared by the contacts that received the data with their respective contacts.

Figure 5:
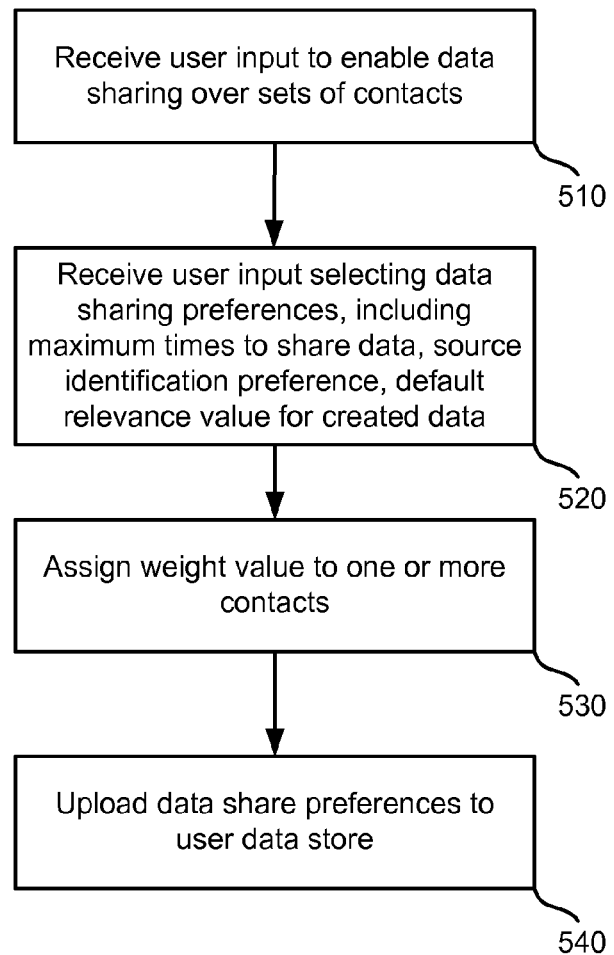
FIG. 5 illustrates a flowchart of an embodiment of a process for configuring data sharing preferences.

FIG. 5 illustrates a flowchart of an embodiment of a process for configuring data sharing preferences. In some embodiments, the process of FIG. 5 provides more detail for step 420 of FIG. 4. First, user input is received to enable data sharing with a set of contacts at step 510. In some embodiments, input is received by an application associated with the communication service, such as messaging client application 204. Next, user input is received which selects data sharing preferences at step 520. The data sharing preferences may include the default number of times data can be shared, source identification preference, default relevance value for generated data and other data. A default number of times that data can be shared is a value assigned to newly created data if not other value is specified by a user. A source identification preference determines whether or not a user will be identified in the path portion of the shared data. If the user is to be identified, the username is shown. If the user is not to be identified in the path data of a data record, an anonymous indication is displayed for the user, such as "* * *."

A weight value is assigned to one or more contacts at step 530. A user may assign a weight value to each contact associated with the user's account with the communication service. The weight value is a measure of trust that the user assigns to the particular contact. When shared data is received from a contact, the relevance value of the data is multiplied by the weight value of the contact to determine a new relevance value. In some embodiments, relevance values and weight values are between 0 and 1. Determining an updated relevance value is discussed in more detail below. After assigning a weight value, data share preferences are stored to a user data store at step 550. In some embodiments, the data share preferences are stored locally in data store 203 of client computer 201. In some embodiments, the user data share preferences are stored by messaging client application 204 to user data store 244 through messaging server 240

Figures 6, 7:
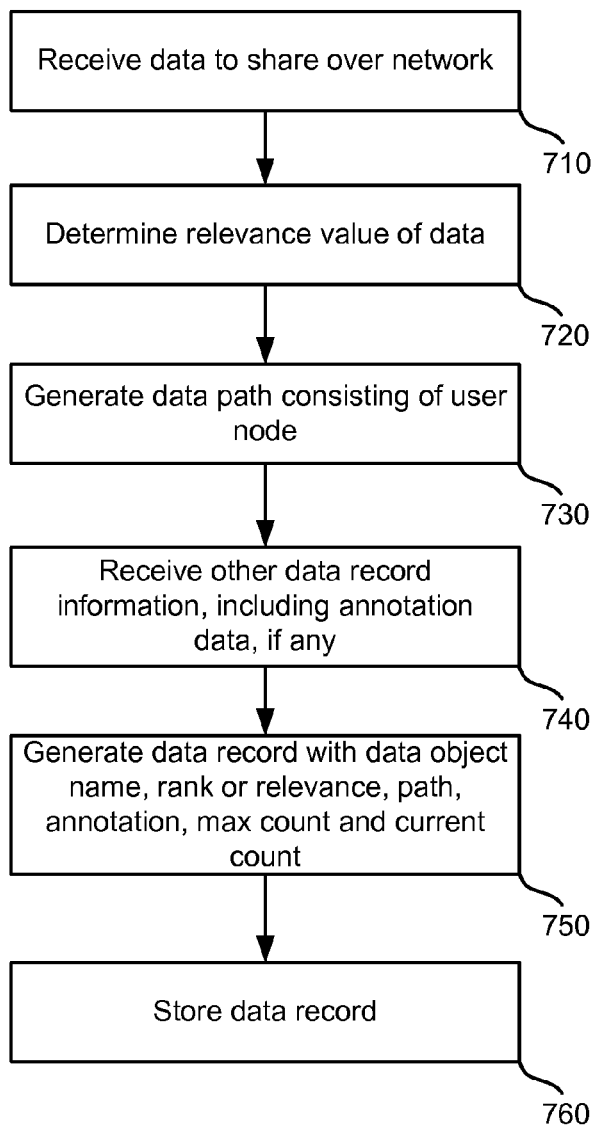
FIG. 6 is an example of the fields contained in a shared data record.
FIG. 7 illustrates a flowchart of an embodiment of a process for creating data to share with contacts.

FIG. 6 is an example of a data record having a number of fields. The data record in FIG. 6 includes a row of field type names and a row of example values for each field type. The data record fields include object name, relevance value, path, annotation, maximum count, current count and time stamp. Object name may include the name of the object selected by the user. In some embodiments, the object name is a URL, such as "www.site.com." The relevance value indicates the relevance or importance of the data to the user logged into the messaging service from a particular machine where the data is stored. In some embodiments, a relevance value ranges from one to zero, where a value of one indicates the highest importance and a relevance value of zero indicates the lowest importance. In the data field of FIG. 6, the data has a relevancy value of 0.8. The path data field indicates the path which the data record has traveled. The path will begin with the user that created the data and will include an indication of each contact which has received the data from another contact, for example "U1/U2/U3." An annotation may include a category or some other data which is added to the data record, such as "movie." The maximum count is the number of times that the data may be shared with additional contacts. The current count is the number of times that the data has been shared. Once the current count has reached the maximum count, the data record cannot be shared anymore. The data record of FIG. 6 has a maximum count of "3" and a current count of "2," indicating that the data record may be shared one more time.

FIG. 7 illustrates a flowchart of an embodiment of a process for creating data to share. In some embodiments, FIG. 7 provides more detail for step 430 of the process of FIG. 4. First, data is received to share over a network at step 710. In one embodiment, the data could be received as a URL selected by the user. For example, a user may select a currently displayed web page to share with the user's contacts. In some embodiments, a button or some other input mechanism may be included in a network browser application for selecting a particular web page and corresponding URL to share. When the button on the network browser application is pressed or selected, the current URL will be inserted into a new data record and stored into local data store 203. In other embodiments, data to share over the network may be received in some other manner, such as by entering text into a box.

The data's relevance value is determined at step 720. In one embodiment, the data relevance value may be automatically assigned a relevance value based on the user's data share preferences as discussed with respect to step 540. In other embodiments, a data relevance value may be determined from user input received through an interface provided by messaging client application 204. Next, a data path is generated at step 730 for the created data. For the newly created data, the data path of the data to be shared by the user will only list the user that created the data.

Other data may be received in the data record at step 740. The other data to complete the data record may include annotation data, maximum count data, time stamp or other data. Next, the data record is generated with its corresponding data fields at step 750. The data fields may be those listed in FIG. 6 and/or other data fields. The data record is stored at step 760. The data record is stored to memory on the local machine used by a user. In some embodiments, data record 202 is stored in data store 203 on client computer 201.

Figure 8:
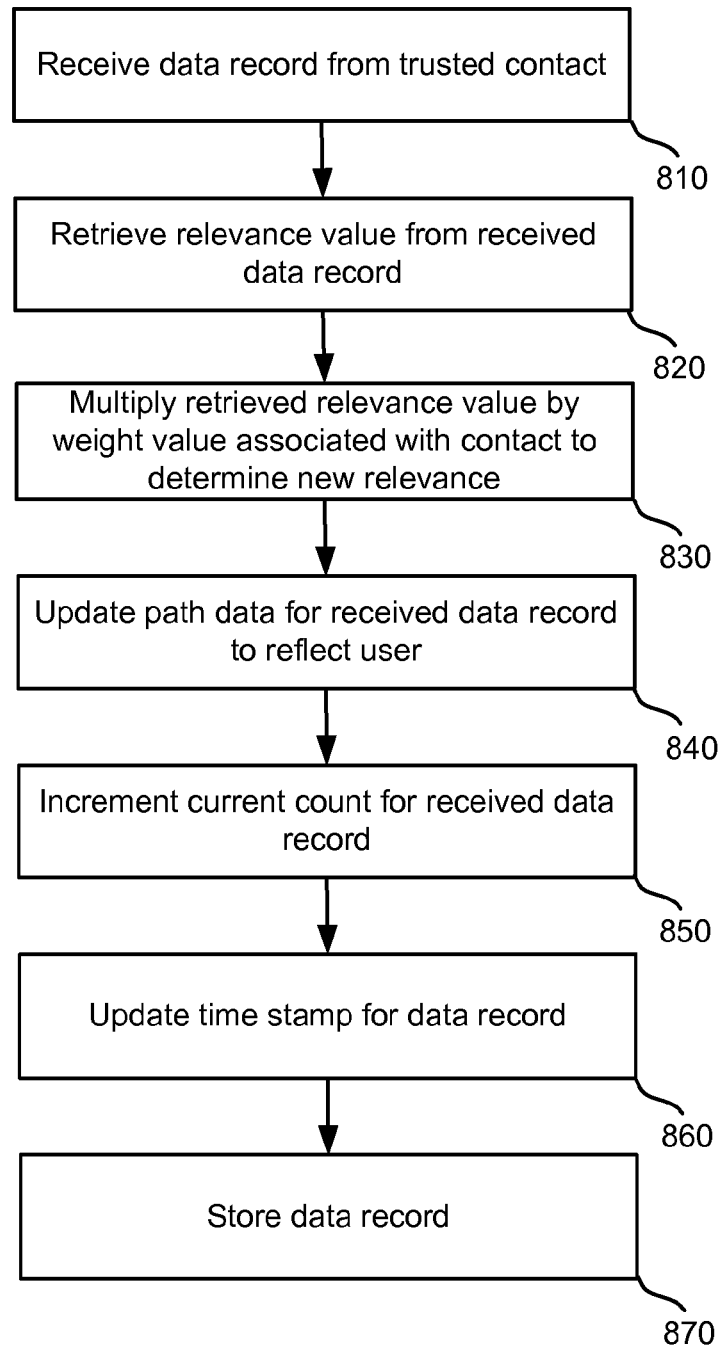
FIG. 8 illustrates a flowchart of an embodiment of a process for receiving shared data from other contacts.

FIG. 8 illustrates a flowchart of an embodiment of a process for receiving shared data from other contacts. In some embodiments, the process of FIG. 8 provides more detail of step 440 of FIG. 4. First, a data record is received from a trusted contact at step 810. For example, in FIG. 1B, user 2 (contact 3) may receive a data record as shared data from user 1.

Next, the relevance value is retrieved from the received data record at step 820. A new relevance value is then determined for the data record at step 830. To determine the new relevance value, the retrieved relevance value is multiplied by the contact weight value associated with the contact who shared the data. For example, if the data record had a relevance value of 0.5 and the contact is associated with a weight value of 0.8, the new relevance value of the shared data would be 0.4 (0.5*0.8=0.4).

The path data is updated to reflect that the user has received the data record at step 840. Updating the path data includes adding user information to the end of the path indicated in the path data field of the data record. The added path data may be the username of the user or an anonymous entry, such as "* * * ." The current count for the data is incremented at step 850. The incremented count will be used to determine whether or not the data record should be shared with additional contacts. The data record time stamp is updated at step 810. The time stamp is updated to the current time to indicate when the user received the data record. The data record is then stored at step 870. In some embodiments, the data record 202 may be stored in data store 203 of computer 201.

Figure 9:
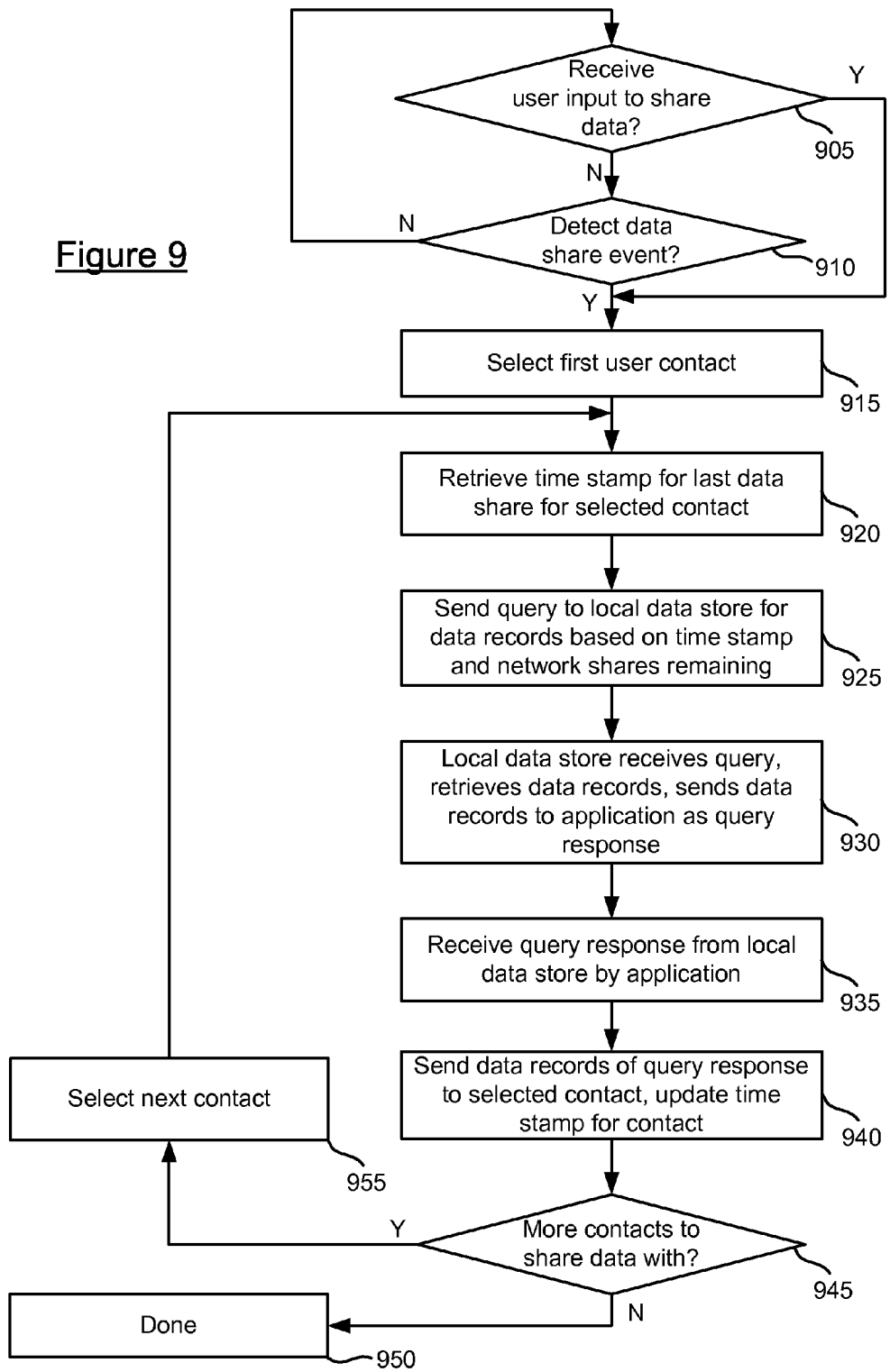
FIG. 9 is a flowchart of an embodiment of a process for sharing data over a contact network.

FIG. 9 is a flowchart of an embodiment of a process for sharing data over a contact network. In some embodiments, the process of FIG. 9 provides more detail for step 460 of FIG. 4. First, a determination is made as to whether user input is received which indicates that data should be shared at step 905. For example, user input may be received to perform a synchronization of data between a user and a contact. In some embodiments, step 905 is optional. If user input is received to share data, the process of FIG. 9 continues to step 915. If input is not received at step 905, the process of FIG. 9 continues to step 910.

A determination is made at step 910 as to whether a data share event is detected at step 910. A data share event may be the expiration of a timer or some other event. For example, data may be shared by a user with the user's contacts periodically, such as every two minutes. Every two minutes, a data share event may be triggered. If a data share event is not detected at step 910, the process of FIG. 9 returns to step 905. If a data share event is detected, the process of FIG. 9 continues to step 915.

A first user contact is selected at step 915. The first user contact may be selected automatically from a list of user contacts provided to messaging client application 204 by messaging server 240. In one embodiment, the selected contact may be one of the user's contacts which is logged into the communication service, such as a messaging service, and enabled a data sharing feature of the service. Next, a time stamp is retrieved for the selected contact at step 920. The retrieved time stamp indicates the last time data was shared with the selected contact.

A query is sent to data store 203 by messaging client application 204 at step 925. The query is for data records contained in data store 203 which are allowed to be shared and have a time stamp more recent than the time stamp associated with the contact to share the data with. Thus, the query searches for data records which have been changed or edited more recently than the time stamp associated with the selected contact and have a current count less than their maximum count. Data records with a time stamp not as recent as the selected contacts time stamp have already been shared with the selected contact. Additionally, if a data record has a current count of shares which is equal to the maximum number of shares allowed for the data record, the particular data record may not be shared anymore.

Local data store 203 receives the query, retrieves any data records that match the query, and sends any matching data records to messaging client application 204 in a query response at step 930. Messaging client application 204 receives the query response from data store 203 at step 935. The data records of the query response are then sent to the selected contact and the time stamp for the contact is updated at step 940. For example, with respect to FIG. 2A, the data can shared over a messaging connection between client computer 201 or 205. In one embodiment, the data is shared using the file sharing feature of a messaging service. The shared data is processed by the receiving computer as discussed with respect to the process of FIG. 8.

Messaging client application 204 then determines whether there are more contacts to share data with at step 945. There are more contacts to share data with if, in the current cycle of sharing data, there are one or more contacts which are online, have data sharing enabled and for which the user has not shared data. If no further contacts exist to share data with, the process of FIG. 9 ends at step 950. If there are more contacts to share data with, the next contact is selected at step 955 and the process of FIG. 9 returns to step 920.

Figure 10:
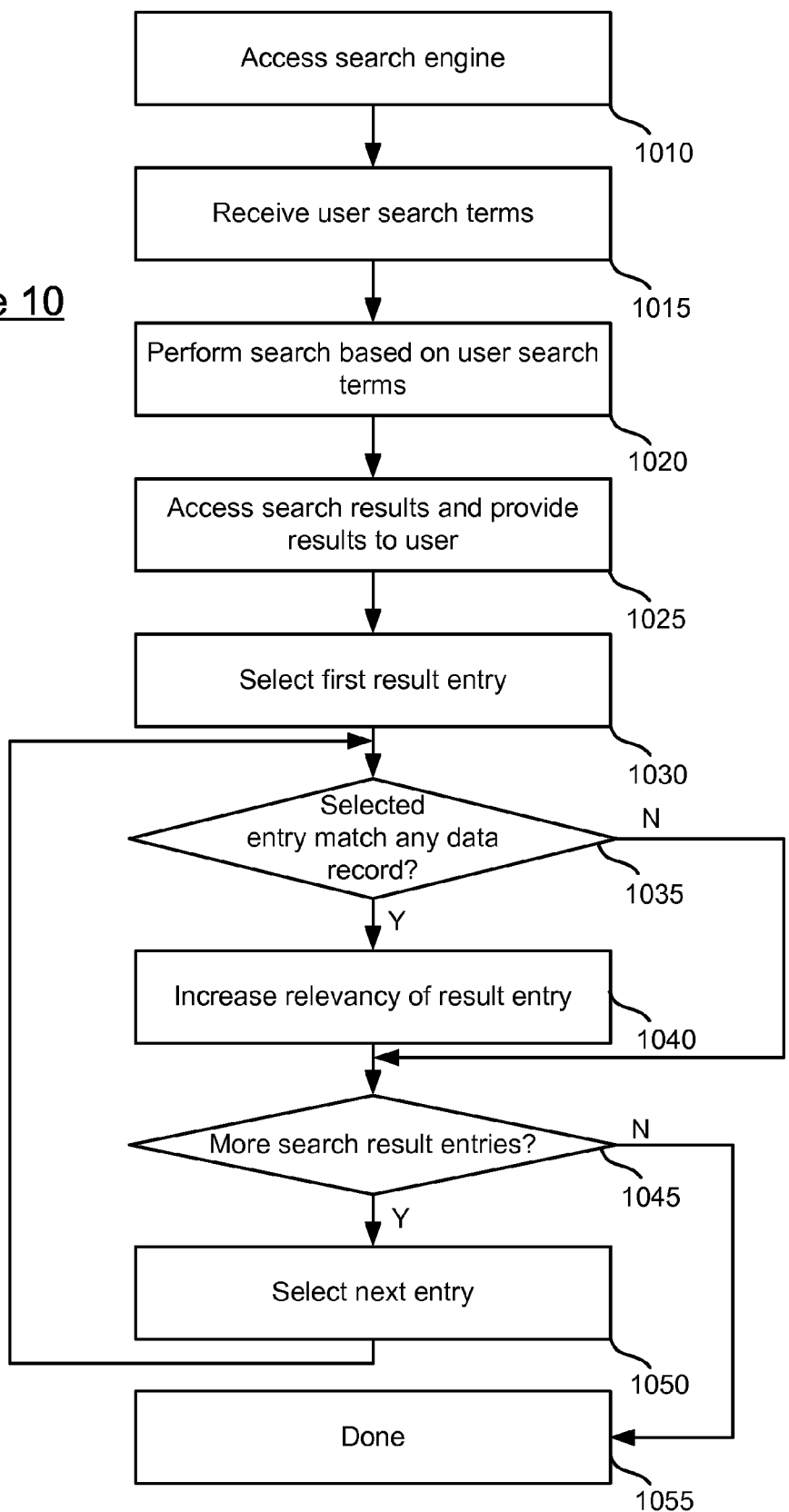
FIG. 10 is a flowchart of an embodiment of a process for manipulating a set of data based on shared data.

As discussed above, shared data may be used to manipulate other sets of data. For example, shared data may be used to manipulate the relevance of search results. FIG. 10 illustrates a flowchart of an embodiment of a process for manipulating a set of data based on shared data. In some embodiments, FIG. 10 provides more detail of step 470 in the process of FIG. 4. FIG. 10 provides an example of manipulating data which consists of search results. Other types of data may be manipulated using the shared data as well.

First, a search engine is accessed at step 1010. In some embodiments, accessing the search engine may include accessing a web-based search engine, such as "MSN Live Search" by Microsoft Corporation, located at "search.msn.com." The search engine receives the user's search terms at step 1015. A search is performed by the search engine based on the user's search terms at step 1020. Search results are determined by the search engine at step 1025. The search results may include a number of results entries. Each result entry may be associated with a rank. The listing of the search results is based on the rank of each entry. The search results may be manipulated using the shared data by changing the rank value and corresponding listing order relevancy of the result entries based on whether or not they match any shared data.

A first result entry is selected at step 1030. A determination is made as to whether the selected entry matches any shared data record at step 1035. In some embodiments, a determination is made as to whether the result entry matches a URL contained in a data record stored in data store 203. In other embodiments, the determination includes parsing the search results and determining whether any portion of the search result matches a keyword, category or other information in the annotation data field of the data record. If a selected entry matches any data record, the rank of the result entry is increased at step 1040. In some embodiments, the rank may be doubled or increased in some other manner. After increasing the relevancy of one or more result entries at step 1040, the process of FIG. 10 continues to step 1045. If the selected entry does not match any data record, the process of FIG. 10 continues to step 1045.

A determination is made as to whether more search result entries exist to be compared at step 1045. If more result entries exist to be compared, the next entry is selected at step 1050 and the process of FIG. 10 returns to step 1035. If no further result entries exist to be compared, the process of FIG. 10 is complete at step 1055.

The system of the present technology may have several advantages. First, the system utilizes a decentralized architecture and communication channels of a network service in which users have a predefined trust relationship. The decentralized prevents data from being stored on any one centralized server which is subject to being compromised. The communication channels allow for users to communicate information directly with each other, rather than with the public at large. These features enable user privacy. Additionally, sharing information may deliver better quality of service for services provided to different users. For example, sharing URLs between users may help narrow down search results of URLs. This is discussed in more detail with respect to the process FIG. 10.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for sharing data, comprising:
creating a first data record to be shared with multiple layers of contacts, wherein the multiple layers of contacts comprises:
a first layer of contacts comprising a first group of contacts known to and having a defined trust relationship with a user creating the first data record,
a second layer of contacts comprising a second group of contacts known to and having a defined trust relationship with one or more contacts of the first group of contacts, and
a third layer of contacts comprising a third group of contacts known to and having a defined trust relationship with one or more contacts of the second group of contacts,
wherein the user defines in the data record a count value defining the number of layers of contacts to which the first data record may be disseminated;
determining a first relevance value for the first data record, the first relevance value defining a degree of importance associated with the data included in the first data record, each contact in each layer of contacts that receives the first data record capable of altering the first relevance value based on the degree of importance associated with the data record by the receiving contact;
inserting the first relevance value into the first data record;
automatically sharing the first data record and the first relevance value to each contact in the number of layers of the multiple layers of contacts defined in the count value, the first data record being automatically shared with each contact in defined number of layers through a network-based peer-to-peer communication service to avoid centralized storage of the first data record,
wherein the first data record is stored in a local data store of each contact receiving the first data record; and
storing a weight value for each contact associated with the first user, the weight value stored in local memory;
automatically updating the first relevance value in the first data record each time the first data record is shared with a contact in the multiple layers of contacts receiving the first data record, automatically updating the first relevance value in the first data record each time the first data record is shared including:
retrieving the first relevance value from the first data record;
updating the first relevance value retrieved from the first data record based on the first relevance value retrieved from the first data record and a weight value associated with a source from which the first data record is received, updating the first relevance value based on the first relevance value retrieved from the first data record and a weight value associated with a source from which the first data record is received including calculating a product of the retrieved first relevance value and the weight value associated with the source from which the first data record is received;
inserting the updated first relevance value into the first data record, thereby updating the first relevance value in the first data record; and
ranking search results performed by a contact of the one of the first, second, and third groups of contacts, wherein the search results includes the first data record and the ranking is based at least in part on the first relevance value.

2. The method of claim 1, wherein said step of creating the first data record includes:
receiving user input which specifies the first relevance value for the first data record.

3. The method of claim 1, further comprising:
inserting the count value into the first data record.

4. The method of claim 1, wherein said step of automatically sharing includes:
detecting a share event; and
automatically transmitting the first data record to a first contact over the communication service, the at least two contacts including the first contact.

5. The method of claim 4, wherein said step of automatically sharing includes:
receiving the first data record by the first contact from a source, the source including the first client device;
retrieving the first relevance value from the received first data record;
automatically updating the first relevance value retrieved from the received first data record by calculating a product of the retrieved first relevance value and a weight value associated with the source by the first contact; and
inserting the updated first relevance value into the first data record, thereby updating the first relevance value in the first data record.

6. The method of claim 5, wherein said step of automatically sharing includes:
receiving the first data record by a second contact from the first contact; and
automatically updating the first relevance value retrieved from the received first data record by calculating a product of the first relevance value retrieved from the first data record and a second weight value associated with the first contact by the second contact; and
inserting the updated first relevance value into the first data record.

7. The method of claim 1, wherein said step of automatically sharing includes:
storing a weight value for each contact associated with the first user, the weight value stored in local memory.

8. The method of claim 1, wherein the first data record includes the first relevance value, a path over which the first data record is shared with the at least two contacts, the count value, and a number of times the first data record has been shared with the at least two contacts.

9. The method of claim 1, wherein the communication service is an instant messaging service provided over a network.

10. A tangible computer-readable storage medium, wherein the computer-readable medium is not a signal, the computer-readable medium having computer-executable instructions for programming one or more processors to perform a method comprising:

creating a first data record to be shared with multiple layers of contacts, wherein the multiple layers of contacts comprises:

a first layer of contacts comprising a first group of contacts known to and having a defined trust relationship with a user creating the first data record, a second layer of contacts comprising a second group of contacts known to and having a defined trust relationship with one or more contacts of the first group of contacts, and a third layer of contacts comprising a third group of contacts known to and having a defined trust relationship with one or more contacts of the second group of contacts, wherein the user defines in the data record a count value defining the number of layers of contacts to which the first data record may be disseminated;

associating a data record with a first relevance value provided by a first user, said data record is shared by the first user with other users interrelated by trust relationships;

comparing a number of times that the data record has been shared with said other users to confirm that the number is less than a maximum count value;

comparing a first time stamp associated with the data record to a second time stamp associated with a second user, said second time stamp associated with the second user indicates a time that data has been recently shared with the second user;

automatically transmitting the data record and the first relevance value to each contact in the number of layers of the multiple layers of contacts defined in the count value, the first data record being automatically transmitted to each contact in defined number of layers the second using a peer-to-peer network to avoid centralized storage of the data record network based communication service based on said steps of comparing, said automatically transmitting the data record and the first relevance value to the second user based on said steps of comparing includes transmitting the data record and the first relevance value to the second user in response to determining that the first time stamp associated with the data record is more recent than the second time stamp associated with the second user and in response to determining that the number of times that the data record has been shared with said other users is less than the maximum count value, the first user and second user having a first trust relationship, wherein the data record is stored in a local data store of the second user; and automatically determining a second relevance value based on the first relevance value for the data record received by the second user and the first trust relationship between the first user and the second user.

11. The computer-readable storage medium of claim 10, wherein said step of associating a first relevance value includes:

receiving the first relevance value input for the data record from the first user; and storing the first relevance value as part of the data record.

12. The computer-readable storage medium of claim 10, wherein said step of automatically determining a second relevance:

accessing the first relevance value;

accessing a weight value associated with the first user; and determining the second relevance value as the result of multiplying the first relevance value by the weight value.

13. The computer-readable storage medium of claim 10, wherein contact information for the second user is stored in a communication service account for the first user.

14. The computer-readable storage medium of claim 10, further comprising:

automatically transmitting the data record and the second relevance value to a third user using the communication service, the second user and third user having a second trust relationship; and automatically determining a third relevance value based on the second relevance value for the data record received by the third user and the second trust relationship between the second user and the third user.

15. The computer-readable storage medium of claim 10, further comprising:

accessing a list of two or more data items, each data item having a rank;

determining whether one of the two or more data items matches a portion of content of the data record; and modifying the rank of the matching data item based on said step of determining.

16. A method for sharing data, comprising:

creating one or more data records to be shared with multiple layers of contacts, each data record including a URL that is:

i) in the stored list of favorite URLs for the user creating the one or more data records, or ii) is in the stored browser history of URLs visited by the user creating the one or more data records, wherein the multiple layers of contacts comprises:

a first layer of contacts comprising a first group of contacts known to and having a defined trust relationship with a user creating the first data record, a second layer of contacts comprising a second group of contacts known to and having a defined trust relationship with one or more contacts of the first group of contacts, and a third layer of contacts comprising a third group of contacts known to and having a defined trust relationship with one or more contacts of the second group of contacts, wherein the user defines in the data record a count value defining the number of layers of contacts to which the first data record may be disseminated;

inserting one or more relevance values into the one or more data records, the one or more relevance values defining a degree of importance associated with the data included in the one or more data records, each contact in each layer of contacts that receives the first data record capable of altering the one or more relevance values based on the degree of importance associated with the data record by the receiving contact;

automatically sharing the one or more data records and the one or more relevance values to each contact in the number of layers of the multiple layers of contacts defined in the count value, the one or more data records being automatically shared with each contact in defined number of layers through a peer-to-peer communication network wherein the one or more data records are stored in a local data store of each contact receiving the first data record;

ranking search results in a search performed by a contact receiving the one or more data records by assigning a ranking to a URL identified in both the search results and in the one or more data records that is higher than a ranking of that URL had it not appeared in the one or more data records.

17. The method of claim 16, wherein said step of automatically sharing includes:

detecting a share event; and automatically transmitting the one or more data records to contacts in the number of layers of contacts specified in the count value.

18. The method of claim 17, wherein said step of automatically sharing includes:

receiving the first data record by the first contact from a source, the source including the first client device;

retrieving the first relevance value from the received first data record;

automatically updating the first relevance value retrieved from the received first data record by calculating a product of the retrieved first relevance value and a weight value associated with the source by the first contact; and inserting the updated first relevance value into the first data record, thereby updating the first relevance value in the first data record.

19. The method of claim 18, wherein said step of automatically sharing includes:

receiving the first data record by a second contact from the first contact; and automatically updating the first relevance value retrieved from the received first data record by calculating a product of the first relevance value retrieved from the first data record and a second weight value associated with the first contact by the second contact; and inserting the updated first relevance value into the first data record.

* * * * *